United States Patent [19]

Hol et al.

[11] Patent Number: 5,049,889
[45] Date of Patent: Sep. 17, 1991

[54] MOVING TARGET INDICATION UNIT

[75] Inventors: Willem A. Hol, Hengelo; Jan Bergman, Haaksbergen, both of Netherlands

[73] Assignee: Hollandse Signaalapparaten B.V., Hengelo, Netherlands

[21] Appl. No.: 292,674

[22] Filed: Jan. 3, 1989

[30] Foreign Application Priority Data

Jan. 4, 1988 [NL] Netherlands ............... 8800002

[51] Int. Cl.[5] .............................................. G01S 13/534
[52] U.S. Cl. ....................................... 342/160; 342/162
[58] Field of Search ................................ 342/159-162

[56] References Cited

U.S. PATENT DOCUMENTS

| H108 | 8/1986 | Gerlach | 342/159 |
|---|---|---|---|
| 3,701,149 | 10/1972 | Patton et al. | 342/93 |
| 4,053,885 | 10/1977 | Tomita et al. | 342/162 |
| 4,057,800 | 11/1977 | Ganz | 342/116 |
| 4,093,949 | 6/1978 | Evans | 342/98 |
| 4,234,880 | 4/1980 | Klemm | 342/159 |
| 4,503,432 | 3/1985 | Bailey | 342/93 |
| 4,536,764 | 8/1985 | Freeman | 342/91 |
| 4,636,793 | 1/1987 | D'Addio et al. | 342/162 |
| 4,652,881 | 3/1987 | Lewis | 342/160 |
| 4,654,665 | 3/1987 | Kiuchi et al. | 342/160 |
| 4,688,044 | 8/1987 | O'Brien | 342/160 |

FOREIGN PATENT DOCUMENTS

| 7288781 | 1/1982 | Australia . |
| 0227457 | 1/1987 | European Pat. Off. . |
| 8800002 | 4/1988 | Netherlands . |

Primary Examiner—John B. Sotomayor
Attorney, Agent, or Firm—Robert J. Kraus

[57] ABSTRACT

Moving target indication unit provided with a doppler filter bank (1) with n output channels $A_i$ (i=0, 1, 2, ..., n−1), several threshold circuits (24.i) connected to the output channels, a detection and registration unit (7, 14, 18, 23) provided with means (7, 14, 18) for the determination and registration, per azimuth cell, of a parameter for the amount of clutter in an azimuth cell. The said means are further suitable for determining, based on the output signals of the filter bank (1), k (k≧2) parameters per azimuth cell and processing per azimuth cell the combination of k parameters to obtain n threshold values, used to set the n threshold circuits.

8 Claims, 4 Drawing Sheets

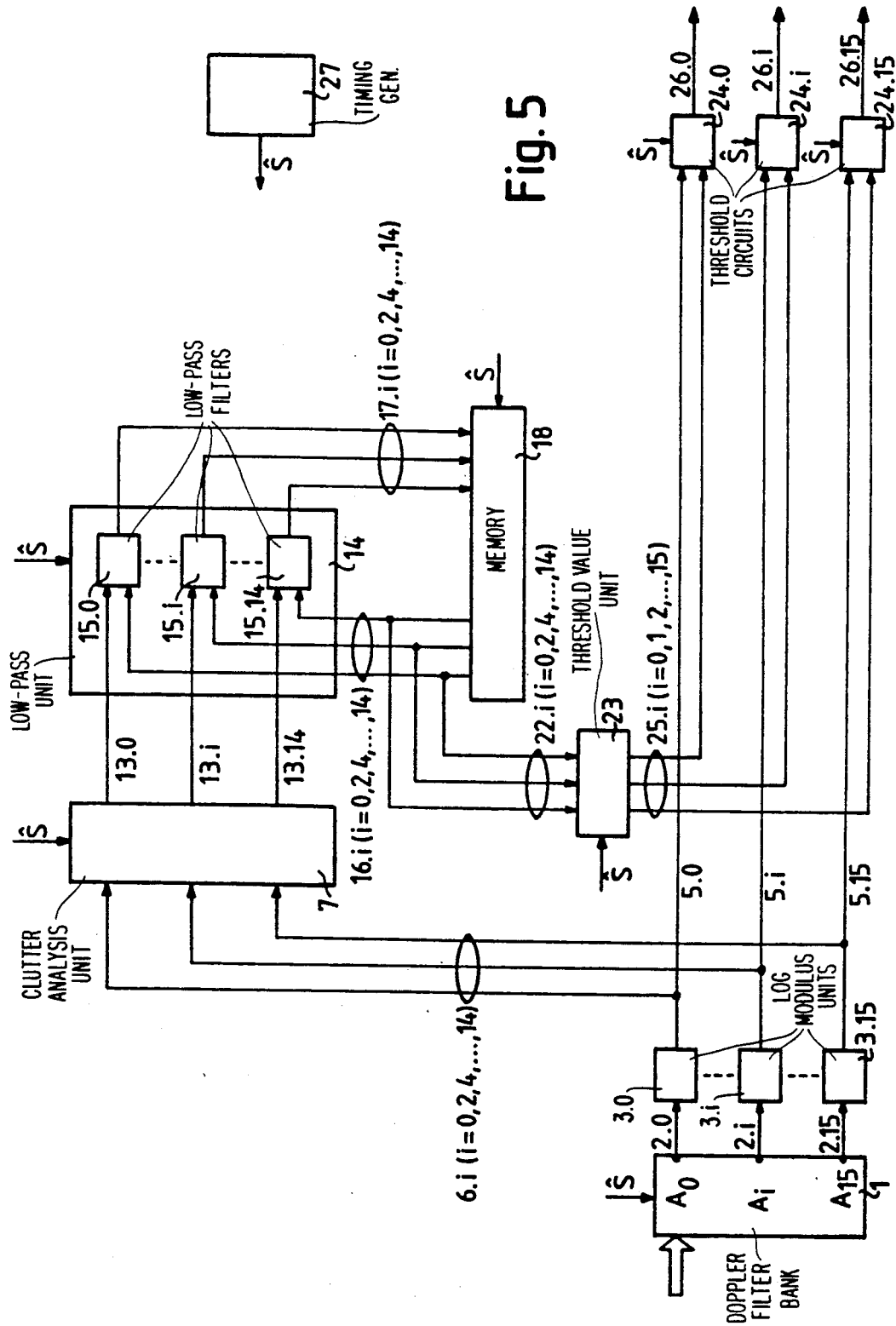

MOVING TARGET INDICATION UNIT

BACKGROUND OF THE INVENTION

The present invention relates to a moving target indication unit provided with a bank of Doppler filters with n output channels $A_i$ (i=0, 1, 2, ..., n−1), several threshold circuits connected to the output channels, a detection and registration unit provided with means for determining and storing, per azimuth cell, a parameter for the amount of clutter in the azimuth cell, and for setting the threshold circuits per azimuth cell on the basis of the parameter.

In such a known system, the output signal of filter channel 0, the channel with Doppler speeds of around 0 Hz, is used to estimate a parameter of the amount of clutter in an azimuth cell. This value is subsequently stored in a memory. To obtain a parameter for the amount of clutter in the remaining filter channels, a fixed functional connection is assumed between, on the one hand, the amount of clutter in output channel 0 and, on the other hand, the amount of clutter in the remaining channels. In other words a distribution of the clutter across the different channels is assumed. This implies that an estimation is made of the amount of clutter in the filter channels $A_i$ (i=1, 2, ..., n−1). It has been proven in practice that clutter suppression is not always effective. The inventor found that this is caused by the fact that the clutter distribution across the different output channels $A_i$ is dependent on the type of clutter confronted. Different types of clutter occur especially in the case of search radars, where the radar covers different types of territories, e.g. land and sea clutter. Different types of clutter also occur as a result of variable weather conditions.

SUMMARY OF THE INVENTION

It is an object of the invention to solve the above-mentioned problems on the basis of the conclusion that the unsatisfactory clutter surpression is caused by a variable distribution of the amount of clutter across the different output channels $A_i$. In accordance with the invention, means are provided for determining, based on the output signals of the filterbank, k (k≧2) parameters per azimuth cell and for processing per azimuth cell the combination of k parameters to obtain n threshold values. These values are used to set the n threshold circuits.

Because, according to the invention, for n filter channels k≧2 parameters are used to determine the amount of clutter for each azimuth cell, it is possible to obtain a better impression of the changing functional relationships as regards the distribution of the amount of clutter across various output channels. To determine the k parameters $b_i$ belonging to the k filter channels $A_i$ concerned, a parallel circuit of k known clutter analysis units can be used.

A special embodiment of the MTI-unit according to the invention is characterised in that k=n.

Because for each filter channel the amount of clutter per azimuth cell is determined, the threshold circuit belonging to the filter channel can be optimally adjusted without assuming a functional relationship indicating the distribution of clutter across the various filter channels.

An advantageous embodiment of the MTI-unit according to the invention includes interpolation means for determining and storing the parameters $b_i$ and $b_{i+2}$ based on the output signals $U_i$ and $U_{i+2}$ of output channels $A_i$ and $A_{i+2}$, for obtaining threshold values $B_i$ and $B_{i+2}$ based on the parameters $b_i$ and $b_{i+2}$ and for obtaining threshold values $B_i$ from parameters $b_i$ and $b_{i+2}$ by means of interpolation.

Due to the application of interpolation, the memory capacity of the MTI unit can be limited to allow a cheaper construction of the MTI unit. It has been proven, that assuming a properly chosen form of interpolation, the performance is only slightly deteriorated.

An especially effective MTI unit can be applied in a radar apparatus with p different p.r.f.'s, where the means mentioned are suitable for determining and storing of the parameters per azimuth cell and per p.r.f., and for setting the threshold circuits per azimuth cell and per p.r.f. used.

By means of the interpolation methods described above, however, the number of clutter maps can be reduced. The combination of staggering on the one hand and interpolation on the other hand produces a combined result, allowing a particularly effective clutter suppression, while multiple-time-around echoes can be suppressed.

BRIEF DESCRIPTION OF THE DRAWINGS

The invention will be further explained with reference to the following figures, of which

FIG. 5 shows a cost-effective embodiment of an MTI unit according to the invention.

DESCRIPTION OF THE PREFERRED EMBODIMENTS

Figure 1:
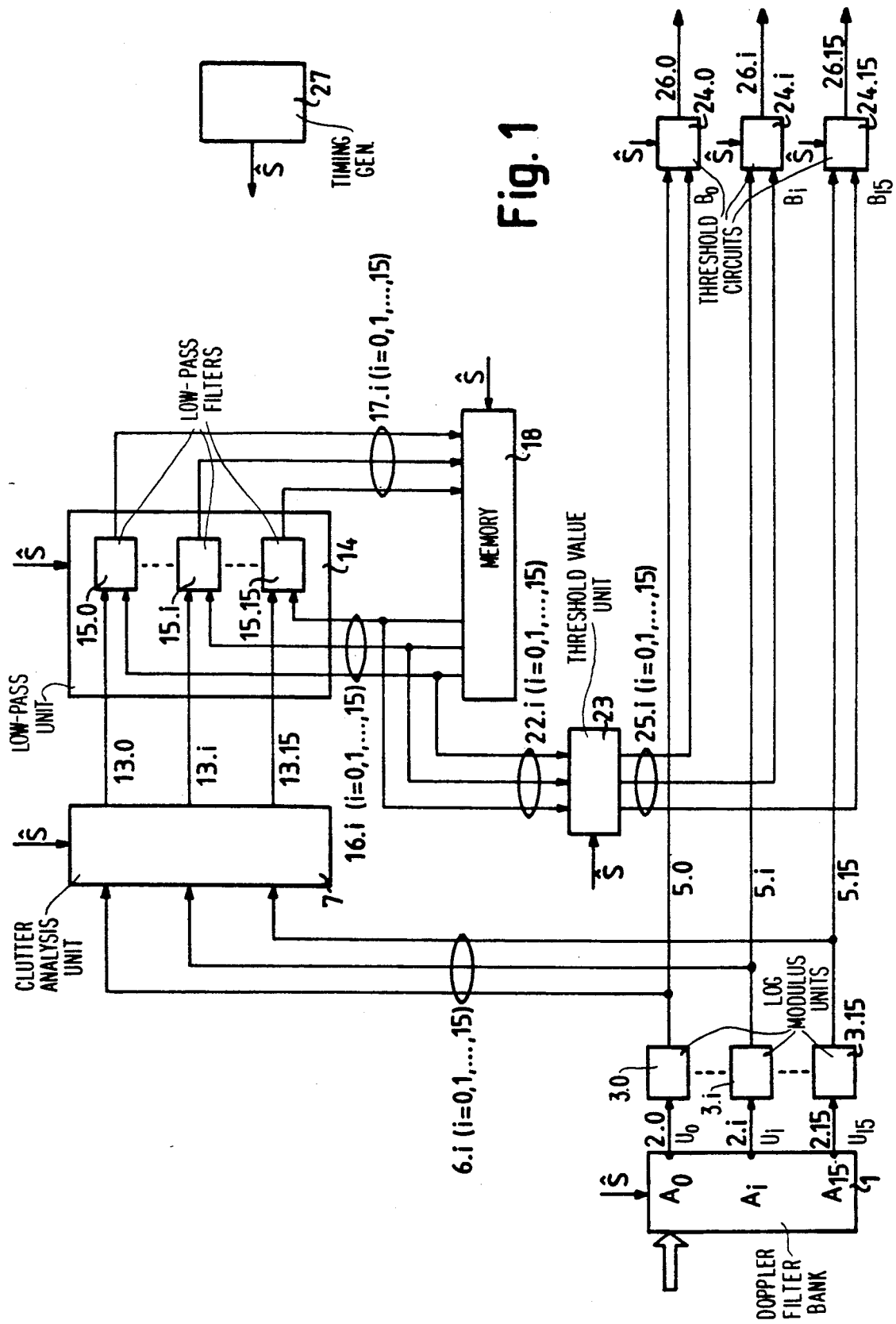
FIG. 1 shows a first possible embodiment of an MTI unit according to the invention.

FIG. 1 illustrates a doppler filter bank 1 with 16 output channels $A_i$ (i=0, 1, ..., 15) (n=16).

Figure 2:
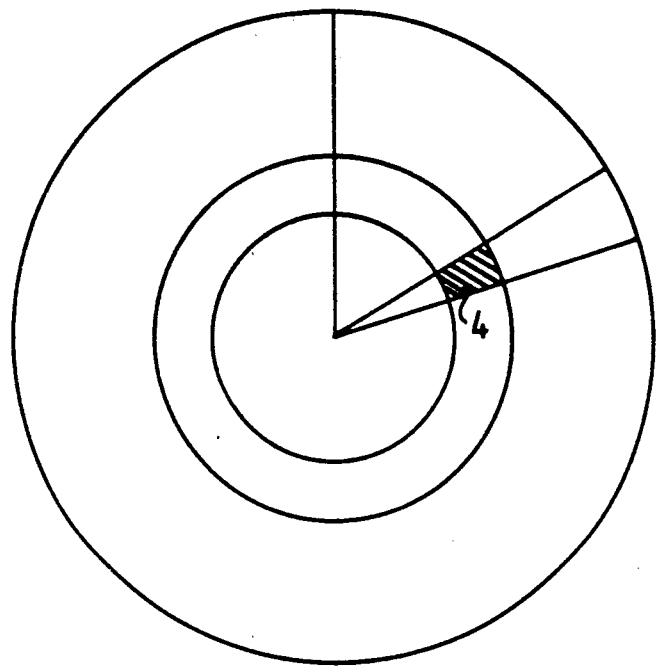
FIG. 2 shows a division of the range of a radar apparatus into azimuth cells.

The output signals of filter bank 1 in this embodiment consist in echo signals from a pulse doppler surveillance radar. These echo signals have after reception been transformed to an intermediate frequency. The doppler frequencies of the echo signals transformed to intermediate frequency are analysed in frequency by means of doppler filter bank 1. In practice, it is possible that the echo signals, before being supplied to the doppler filter, are digitised by means of an A/D converter, enabling the application of a 16-point FFT for the doppler filter bank. However, this does not exclude application of an analogue 16-point doppler filter. Filter channel $A_O$ embodies a zero-velocity filter. The sixteen output signals $U_i$ (i=0, 1, ..., 15) of the doppler filter bank are supplied via lines 2.i (i=0, 1, ..., 15) respectively to log-modulus units 3.i (i=0, 1, ..., 15). It is also possible to implement units 3.i for generation of the modulus square or the modulus of the input signal. The area covered by the search radar is illustrated in FIG. 2. The area has been divided into a number of azimuth cells, one of which is azimuth cell 4.

For the embodiment in question it is assumed that the pulse repetition frequency of the search radar apparatus into which the MTI-unit has been implemented is 400

Hz, while a complete revolution is made in 6 sec. The radar apparatus therefore generates 2400 transmitter pulses in one revolution. The 16-point FFT sweeps are executed with a mutual overlap of twelve radar sweeps, i.e. two subsequent FFT sweeps cover an azimuth angle corresponding with the azimuth angle covered by four transmitter pulses. However, one azimuth cell covers 1.4° (one revolution comprises 256 azimuth cells), so one azimuth cell comprises two or three FFT sweeps.

For each azimuth cell the frequency spectrum is determined by means of doppler filterbank 1. Output signals $U_i'$ ($i=0, 1, \ldots, 15$) of the log-modulus units 3.$i$ ($i=0, \ldots, 15$) belonging to an azimuth cell, are supplied via lines 5.$i$ and 6.$i$ ($i=0, \ldots, 15$) to a clutter analysis unit 7. Clutter analysis unit 7 determines per cell for each output channel $A_i$ a parameter $b_i$ ($i=0, 1, \ldots, 15$) representing the maximum amount of clutter.

Figure 3:
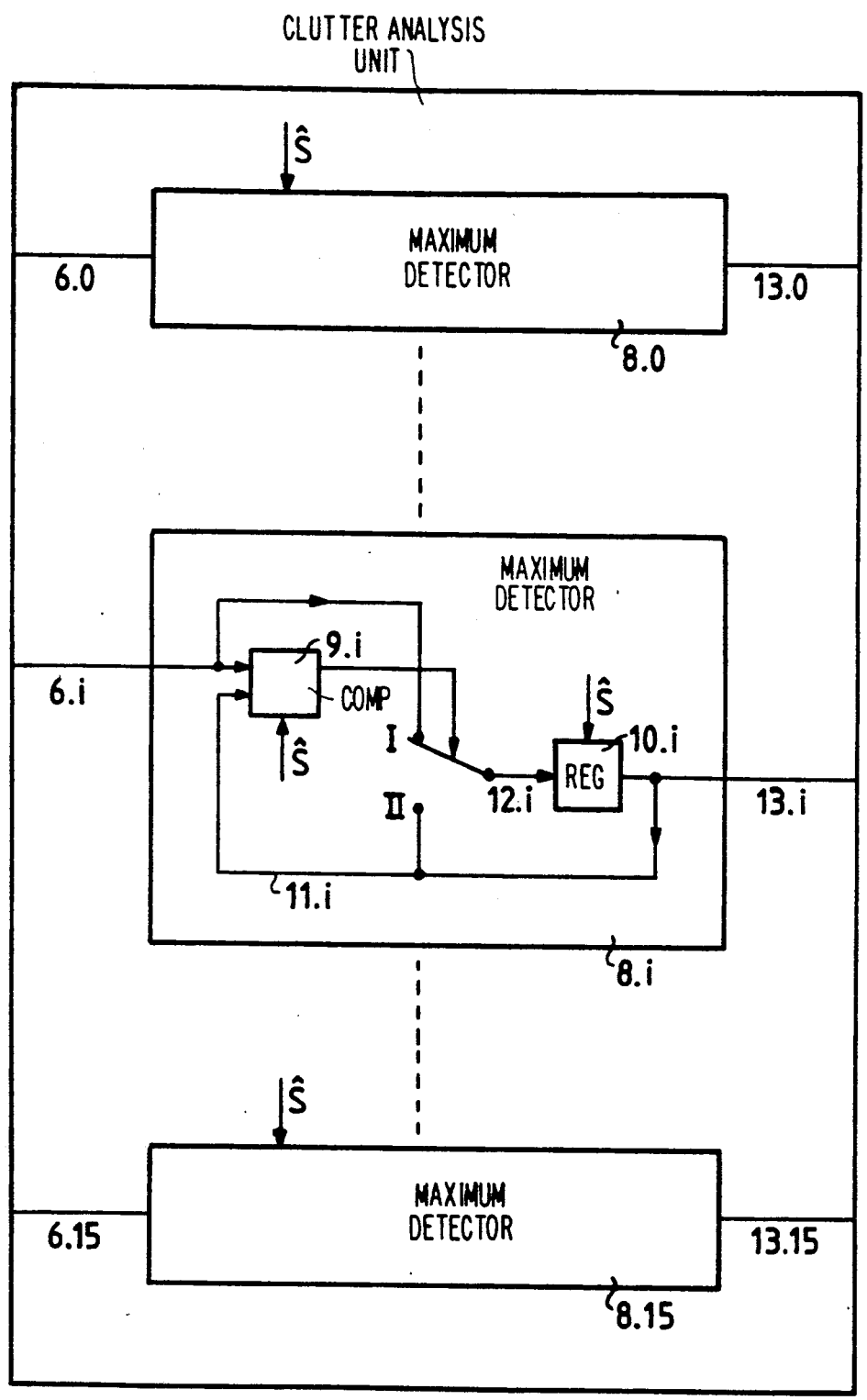
FIG. 3 shows a first embodiment of the clutter analysis unit of FIG. 1.

FIG. 3 illustrates a possible embodiment of clutter analysis unit 7. The clutter analysis unit consists of sixteen parallel-connected and identical maximum detectors 8.$i$ ($i=0, \ldots, 15$). A maximum detector 8.$i$ is provided with a comparator 9.$i$ and a register 10.$i$. At the start of each azimuth cell register 10.$i$ is reset to zero. Signal $U_i'$ belonging to an azimuth cell is supplied to comparator 9.$i$ via line 6.$i$. Comparator 9.$i$ also receives the parameter $b_i$, already stored in register 10.$i$, via line 11.$i$. If $U_i' \geq b_i$, the comparator switches a switching unit 12.$i$ to position I, causing $b_i$ to be overwritten with the value of $U_i'$. In case $U_i' < b_i$, comparator 9.$i$ sets switching unit 12.$i$ to position II, causing the original value of $b_i$ to be written into register 10.$i$ again. In this way, the maximum value of $U'_{imax} = b_i$ is selected from the subsequent signals $U_i$ belonging to the subsequent FFT sweeps of one azimuth cell. The sixteen parameters $b_i$ are supplied to a filter unit 14 via lines 13.$i$ ($i=0, \ldots, 15$) for each azimuth cell. For the filter unit, median, mean or top (modulus) filters may be applied. For mean filters, linear filters qualify, such as low-pass filters, FIR filters or recursive filters. A top filter determines the maximum value of a frequency distribution. In this case the use of low-pass filters is further described. Low-pass unit 14 is in this configuration provided with sixteen parallel-connected and identical low-pass filters 15.$i$ ($i=0, \ldots, 15$). The sixteen output signals of low-pass unit 14 are stored in a memory 18 via lines 17.$i$ ($i=0, \ldots, 15$). Low-pass unit 14 also receives, via lines 16.$i$ ($i=0, \ldots, 15$), the parameters $b_i$ of an azimuth cell already stored in memory 18. The transfer of a low-pass filter 15.$i$ can be described as follows:

$$b_{iN} = b_{iO} + \gamma(b_i - b_{iO}),$$

where $0 < \gamma < 1$.

In this formula, $b_{iO}$ is the old parameter $b_i$, obtained during a preceding revolution, stored in the memory and supplied via line 16.$i$, $b_i$ is a parameter of an azimuth cell determined by clutter analysis unit 7 and supplied via line 13.$i$, and $b_{iN}$ is the parameter supplied via line 17.$i$ with which the parameter $b_{iO}$ is overwritten in the memory.

Figure 4:
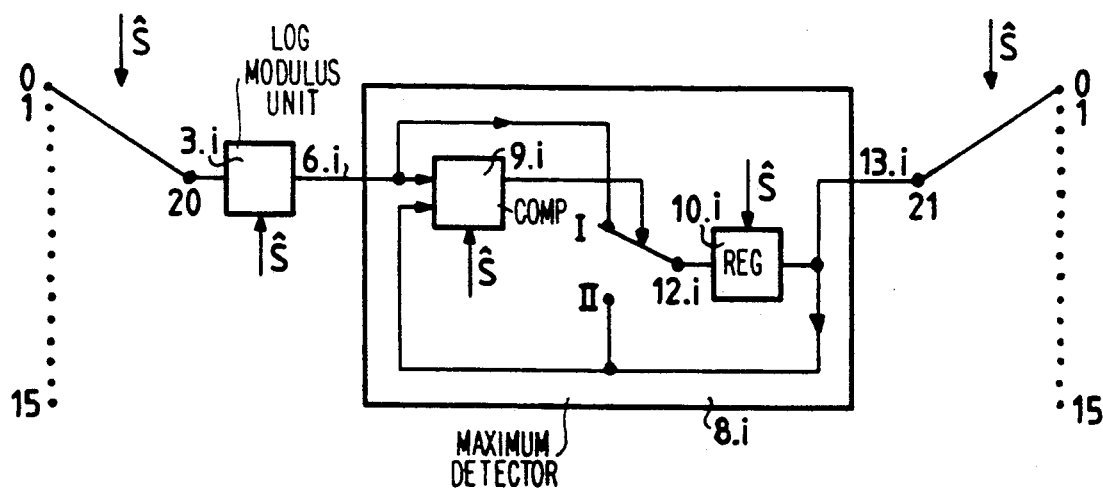
FIG. 4 shows an embodiment of the log-modulus unit operating on a time-sharing basis and the clutter analysis unit of FIG. 1.

It will be clear that it is possible to replace on a time-sharing basis the clutter analysis unit and the log-modulus units 3.$i$ with one comparator 9.$i$, register 10.$i$ and a log-modulus unit 3.$i$ (see FIG. 4). For this purpose, two switching means 20 and 21 are implemented which ensure that signals $b_i$ ($0, \ldots, 15$) are processed and supplied by successively assuming positions 0 to 15. Thus the amount of clutter is recorded for each cell. In this way, a recording is made, as it were, of sixteen clutter maps of the area covered by the search radar: one clutter map for each output channel of the doppler filter. When the search radar covers an azimuth cell of the environment, the accompanying parameters $b_{iO}$ (hereafter called $b_i$) are read from the memory and supplied to a threshold value unit 23 via lines 22.$i$ ($i=0, \ldots, 15$). Threshold value unit 23 for each parameter $b_i$ generates an accompanying signal $B_i$ ($i=0, \ldots, 15$), which is used to set the threshold level of the sixteen threshold circuits 24.$i$ ($i=0, \ldots, 15$) respectively via lines 25.$i$ ($i=0, \ldots, 15$). The output signals $U_i'$ of the log-modulus unit 3.$i$ are supplied to threshold circuit 24.$i$ via lines 5.$i$ ($i=0, \ldots, 15$). If output signals $A_i$ of a log-modulus unit 3.$i$ exceed the accompanying threshold value $B_i$, this signal is supplied for further processing via the accompanying threshold circuits 24.$i$ to lines 26.$i$ ($i=0, \ldots, 15$). Because for each output signal the accompanying clutter map is recorded in the memory, optimal clutter suppression is realised.

An especially cost-effective embodiment is illustrated in FIG. 5. In this embodiment, only the eight output signals $U_i$, of log-modulus units 3.$i$ ($i=0, 2, 4, \ldots, 14$) are supplied to clutter analysis unit 7. Eight clutter maps are therefore stored in the memory, belonging to the output signals of logmodulus units 3.$i$ ($i=0, 2, 4, \ldots, 14$). When the radar apparatus covers an azimuth cell of FIG. 2, the eight accompanying parameters $b_i$ ($i=0, 2, 4, \ldots, 14$) are supplied to threshold value unit 23 via lines 22.$i$ ($i=0, 2, 4, \ldots, 14$). Threshold value unit 23 generates eight threshold value signals $B_i$ ($i=0, 2, \ldots, 14$) form parameters $b_i$ ($i=0, 2, \ldots, 14$).

Threshold values $B_i$ ($i=1, 3, \ldots, 15$) are obtained through interpolation. For this purpose, threshold value unit 23 is provided with means for the execution of the following calculation:

$$b_{i+1} = \frac{\alpha b_i + \beta b_{i+2}}{\alpha + \beta},$$

where $i = 0, 2, \ldots, 14$, where $b_{16} = b_0$ and where $\alpha$ and $\beta$ are scalar weight.

From the values $b_i$ ($i=1, 3, \ldots, 15$) obtained through interpolation, threshold value unit 23 generates threshold value signals $B_i$ ($i=1, 3, \ldots, 15$), which are supplied to threshold circuits 24.$i$ ($i=1, 3, \ldots, 15$) via lines 25.$i$ ($i=1, 3, \ldots, 15$) respectively.

The MTI unit is provided with a timing generator 27 for generating signals S to control the MTI unit in time.

It will be clear that according to the invention other interpolation methods can be used as well. It is also possible to further reduce the number of clutter maps. Thus, it has been shown that an especially effective clutter suppression is only obtained if clutter maps are compiled for output channels $A_i$ ($i=0, 2, 4, 8, 12, 14$). For output channels $A_i$ ($i=6, 7, 9, 10$), the threshold unit uses the clutter map belonging to output channel $A_8$, while for the other channels $A_i$ ($i=1, 3, 5, 11, 13, 15$), the above-described interpolation between two neighbouring output channels is applied.

If the radar apparatus in which the above-described MTI unit is applied, uses a staggered pulse repetition frequency (two or more p.r.f.'s), it is possible to record a set of clutter maps as described above for the pulse repetition frequencies. The number of clutter maps will then double in case staggering implies the use of two p.r.f.'s. Staggering is important for the suppression of multiple-time-around echoes, because they take up different positions for the different p.r.f.'s. If for staggering p different p.r.f.'s are used, the number of clutter maps will be increased by a factor p.

By means of the above-described interpolation methods, the number of clutter maps can however be decreased again. The combination of staggering on the one hand and interpolation on the other hand has the combined result of allowing a specially effective clutter suppression while suppressing multiple-time-around echoes.

We claim:

1. A moving target indication unit comprising:
   a. a doppler filter bank having n output channels $A_i$ ($i = 0, 1, 2, \ldots, n-1$), said filter bank producing on said channels output signals derived from echoes returned from a plurality of azimuth cells;
   b. a detection and registration unit electrically connected to the output channels and including means for determining and storing from the signals produced on k of said n output channels, for each of the azimuth cells, k respective parameters representative of the amount of clutter in said cell, where $k \geq 2$, and for producing threshold values from the parameters, said unit further including interpolation means for processing at least certain ones of said k parameters to determine at least one interpolated threshold value; and
   c. a plurality of threshold circuits electrically connected to the output channels and to the detection and registration unit, threshold levels of said circuits being set for said azimuth cells by respective one of said threshold values and interpolated threshold values.

2. A moving target indication unit as in claim 1 where $k = n$.

3. A moving target indication unit as in claim 1 where the detection and registration unit determines parameters $b_i$ and $b_{i+2}$ from output signals $U_i$ and $U_{i+2}$ of output channels $A_i$ and $A_{i+2}$, respectively, produces threshold values $B_i$ and $B_{i+2}$ from the respective parameters $b_i$ and $b_{i+2}$, and where the interpolation means produces from said parameters the threshold value $B_{i+1}$.

4. A moving target indication unit as in claim 3 where the interpolation means determines the parameters $b_i$ ($i = 0, 2, \ldots, n-2$) in accordance with the relationship:

$$b_{i+1} = \frac{\alpha b_i + \beta b_{i+2}}{\alpha + \beta}$$

where $\alpha$ and $\beta$ are scalar weights.

5. A moving target indication unit as in claim 1 or 2 where the detection and registration unit includes means for processing one of the stored parameters $b_i$ and an output signal $U_i$ to obtain and store a new parameter $b_i$.

6. A moving target indication unit as in claim 1 or 2 where the echoes are obtained at p different pulse repetition frequencies and where the detection and registration unit is adapted for determining and storing said k parameters for each azimuth cell and for each different pulse repetition frequency.

7. A moving target indication unit as in claim 6 where $k = p.n$.

8. A moving target indication unit as in claim 6 where $2 \leq k \leq p.n$.

* * * * *